(12) United States Patent
Shannon et al.

(10) Patent No.: US 10,822,039 B2
(45) Date of Patent: Nov. 3, 2020

(54) BODY ROCKER, BATTERY CROSS-BAR, AND BODY CROSS-BAR CONFIGURATION FOR LOAD DISTRIBUTION BETWEEN VEHICLE BODY AND UNDER-VEHICLE BATTERY

(71) Applicant: GM Global Technology Operations LLC, Detroit, MI (US)

(72) Inventors: Ryan Shannon, Royal Oak, MI (US); Terry A. Swartzell, Ann Arbor, MI (US); Thomas M. Siberski, White Lake, MI (US); Andrew W. White, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 16/278,465

(22) Filed: Feb. 18, 2019

(65) Prior Publication Data

US 2020/0262491 A1    Aug. 20, 2020

(51) Int. Cl.
*B62D 25/20* (2006.01)
*B62D 25/02* (2006.01)
*B60K 1/04* (2019.01)
*B62D 21/03* (2006.01)
*H01M 2/10* (2006.01)

(52) U.S. Cl.
CPC ............ *B62D 25/2036* (2013.01); *B60K 1/04* (2013.01); *B62D 21/03* (2013.01); *B62D 25/025* (2013.01); *B60K 2001/0438* (2013.01); *H01M 2/1083* (2013.01)

(58) Field of Classification Search
CPC .. B62D 25/2036; B62D 21/03; B62D 25/025; B60K 1/04; B60K 2001/0438; H01M 2/1083
USPC ......................................... 296/184.1, 193.07
See application file for complete search history.

(56) References Cited

U.S. PATENT DOCUMENTS

| | | | | |
|---|---|---|---|---|
| 7,128,999 B1* | 10/2006 | Martin | ................ | H01M 2/1077 429/99 |
| 8,079,435 B2* | 12/2011 | Takasaki | ............. | H01M 2/1083 180/68.5 |
| 8,336,658 B2* | 12/2012 | Rawlinson | ........... | B62D 25/025 180/68.5 |
| 9,751,567 B2 | 9/2017 | Siberski et al. | | |
| 9,944,160 B2* | 4/2018 | Nakamura | ................ | B60K 1/04 |
| 10,336,373 B2* | 7/2019 | Tutzer | ................ | B62D 25/2036 |
| 10,494,034 B2* | 12/2019 | Makowski | .......... | H01M 2/1083 |

* cited by examiner

*Primary Examiner* — Pinel E Romain (57) ABSTRACT

An assembly for a vehicle to provide load distribution between the body of the vehicle and a battery contained in the vehicle includes a pair of body rockers, the body rockers being spaced apart and being substantially parallel to each other, a plurality of body cross bars that extend between the pair of body rockers, the plurality of body cross bars being spaced apart, substantially parallel to each other, and substantially perpendicular to the body rockers, and a plurality of battery cross bars that extend between the pair of body rockers, the plurality of battery cross bars being spaced apart, substantially parallel to each other, and substantially perpendicular to the body rockers, portions of the battery being located between adjacent battery cross bars. The plurality of battery cross bars, the plurality of body cross bars and the body rockers are configured to delay initiation of rocker plastic deformation.

20 Claims, 6 Drawing Sheets

BODY ROCKER, BATTERY CROSS-BAR, AND BODY CROSS-BAR CONFIGURATION FOR LOAD DISTRIBUTION BETWEEN VEHICLE BODY AND UNDER-VEHICLE BATTERY

INTRODUCTION

The present disclosure relates to an assembly for load distribution between a vehicle body and battery.

A machine or a manufacture, such as a vehicle, may be subject to an external force event that leads to deformation of the vehicle. Certain vehicles include an assembly that limits portions of the vehicle from lateral deformations. The assembly, for example, may include body rockers on both sides of the vehicle to limit lateral deformations.

While current assemblies achieve their intended purpose, there is a need for a new and improved assembly to protect batteries located, for example, in electric vehicles.

SUMMARY

According to several aspects, an assembly for a vehicle to provide load distribution between the body of the vehicle and a battery contained in the vehicle includes a pair of body rockers functionally and uniquely configured for high strength, the body rockers being spaced apart and being substantially parallel to each other, a plurality of body cross bars that extend between the pair of body rockers, the plurality of body cross bars being spaced apart, substantially parallel to each other, and substantially perpendicular to the body rockers, and a plurality of battery cross bars that extend between the pair of body rockers, the plurality of battery cross bars being spaced apart, substantially parallel to each other, and substantially perpendicular to the body rockers, portions of the battery being located between adjacent battery cross bars. The plurality of battery cross bars, the plurality of body cross bars and the body rockers are functionally and uniquely configured for high strength to maximize the strength of the system by delaying initiation of rocker plastic deformation. As the body rockers crush beyond the initiation of deformation, they absorb energy and distribute loading to the body cross bars and battery cross bars when the vehicle is subjected to lateral deformation from an external force.

In an additional aspect of the present disclosure, the assembly further includes a floor, the floor being positioned between the plurality of body cross bars and the plurality of battery cross bars.

In another aspect of the present disclosure, the plurality of body cross bars is three body cross bars.

In another aspect of the present disclosure, the plurality of battery cross bars is six battery cross bars.

In another aspect of the present disclosure, the plurality of battery cross bars is eight battery cross bars.

In another aspect of the present disclosure, each body rocker includes an inner portion and a web portion that surrounds the inner portion.

In another aspect of the present disclosure, the web portion includes an inner web portion and an outer web portion.

In another aspect of the present disclosure, an outer portion of the inner web portion is welded to the outer portion of the outer web portion.

In another aspect of the present disclosure, the pair of body rockers is made of steel.

According to several aspects, a vehicle body subjectable to an external force includes a floor having substantially parallel outer sides; a pair of body rockers functionally and uniquely configured for high strength, the body rockers being spaced apart and being substantially parallel to each other, the pair of body rockers extending substantially along the outer sides of the floor; a plurality of body cross bars that extend between the pair of body rockers, the plurality of body cross bars being spaced apart, substantially parallel to each other, and substantially perpendicular to the body rockers; and a plurality of battery cross bars that extend between the pair of body rockers, the plurality of battery cross bars being spaced apart, substantially parallel to each other, and substantially perpendicular to the body rockers, portions of the battery being located between adjacent battery cross bars, the floor being positioned between the plurality of body cross bars and the plurality of battery cross bars. The plurality of battery cross bars, the plurality of body cross bars and the body rockers are functionally and uniquely configured for high strength to maximize the strength of the system by delaying initiation of rocker plastic deformation. As the body rockers crush beyond the initiation of deformation, they absorb energy and distribute loading to the body cross bars and battery cross bars when the vehicle is subjected to lateral deformation from an external force.

In another aspect of the present disclosure, the plurality of body cross bars is at least two body cross bars.

In another aspect of the present disclosure, the plurality of battery cross bars is at least six battery cross bars.

In another aspect of the present disclosure, the plurality of battery cross bars is eight battery cross bars.

In another aspect of the present disclosure, each body rocker includes an inner portion and a web portion that surrounds the inner portion.

In another aspect of the present disclosure, the web portion includes an inner web portion and an outer web portion.

In another aspect of the present disclosure, an outer portion of the inner web portion is welded to the outer portion of the outer web portion.

In another aspect of the present disclosure, the pair of body rockers is made of steel.

According to several aspects, a vehicle body subjectable to an external force includes a floor having substantially parallel outer sides; a pair of body rockers functionally and uniquely configured for high strength made of steel, the body rockers being spaced apart and being substantially parallel to each other, the pair of body rockers extending substantially along the outer sides of the floor, each body rocker includes an inner portion and a web portion that surrounds the inner portion; a plurality of body cross bars that extend between the pair of body rockers, the plurality of body cross bars being spaced apart, substantially parallel to each other, and substantially perpendicular to the body rockers; and a plurality of battery cross bars that extend between the pair of body rockers, the plurality of battery cross bars being spaced apart, substantially parallel to each other, and substantially perpendicular to the body rockers, portions of the battery being located between adjacent battery cross bars, the floor being positioned between the plurality of body cross bars and the plurality of battery cross bars. The plurality of battery cross bars, the plurality of body cross bars and the body rockers are functionally and uniquely configured for high strength to maximize the strength of the system by delaying initiation of rocker plastic deformation. As the body rockers crush beyond the initiation of deformation, they absorb energy and distribute loading to the body cross bars and battery cross bars when the vehicle is subjected to lateral deformation from an external force.

In another aspect of the present disclosure, the web portion includes an inner web portion and an outer web portion.

In another aspect of the present disclosure, an outer portion of the inner web portion is welded to the outer portion of the outer web portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
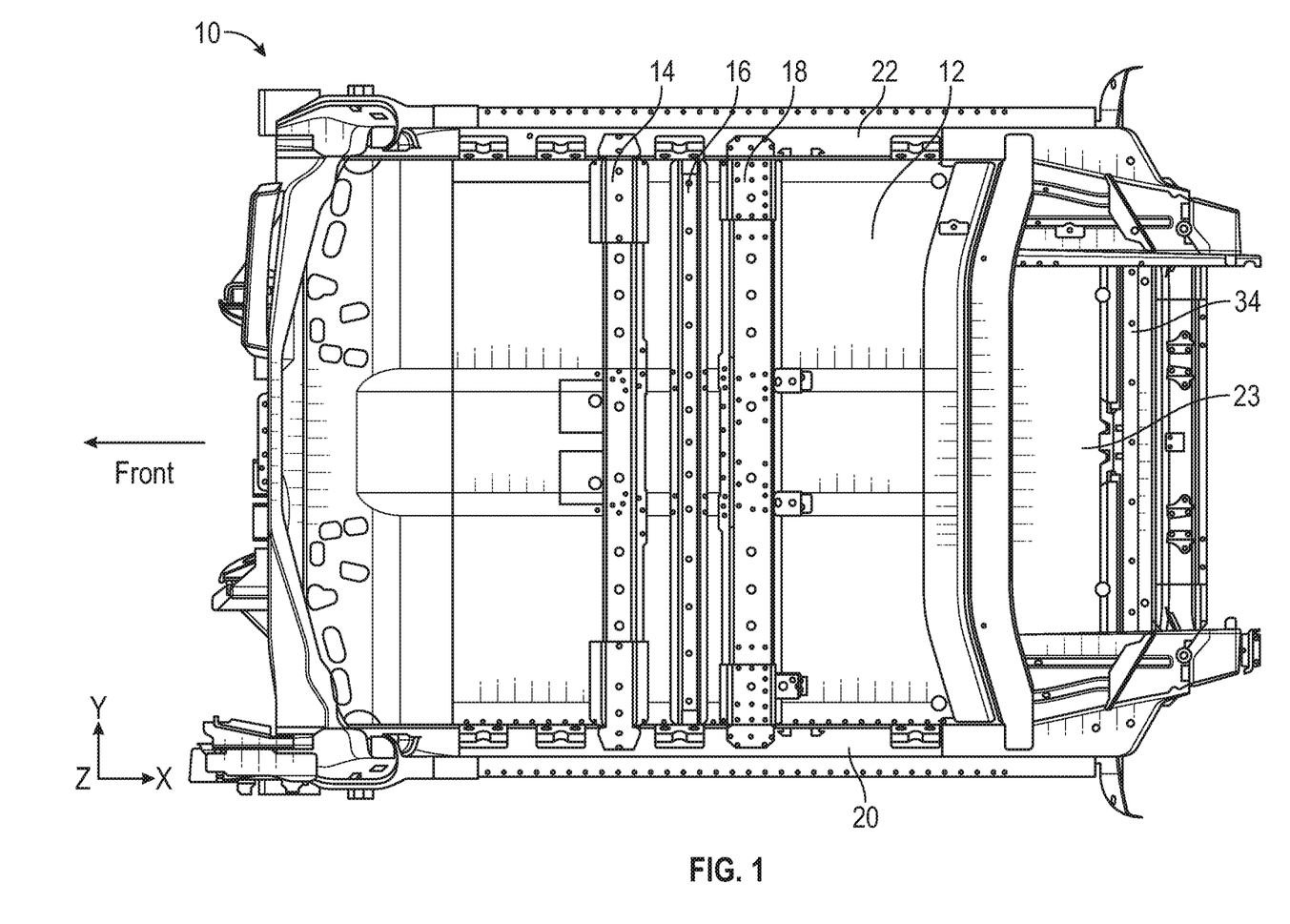
FIG. 1 is a top view of an assembly for a motor vehicle to provide load distribution between the body of the vehicle and a battery contained in the vehicle according to an exemplary embodiment.

Referring to FIG. 1, there is shown an assembly 10 for a motor vehicle, in particular, an electric motor vehicle. The assembly 10 includes a floor 12 arranged generally parallel to the x-y plane. On each side of the floor 12 is a rocker 20 and 22. The rockers 20 and 22 are spaced apart and generally parallel to each other. Further, a set of body cross bars 14, 16 and 18 are located between the rockers 20 and 22. The ends of the body cross bars 14, 16 and 18 are attached, for example, by welding, bolts or any other suitable attachment mechanism to the respective rockers 20 and 22. The body cross bars 14, 16 and 18 are generally spaced apart, parallel to each other and perpendicular to the rockers 20 and 22. Although FIG. 1 shows three body cross bars, in some arrangements, the assembly 10 includes fewer than three body cross bars, while in other arrangements, the assembly includes more than three body cross bars. In various arrangements, each rocker 20 and 22 is made of steel. The body cross bars 14, 16 and 18 are made of steel, aluminum or composite structure.

Figure 2:
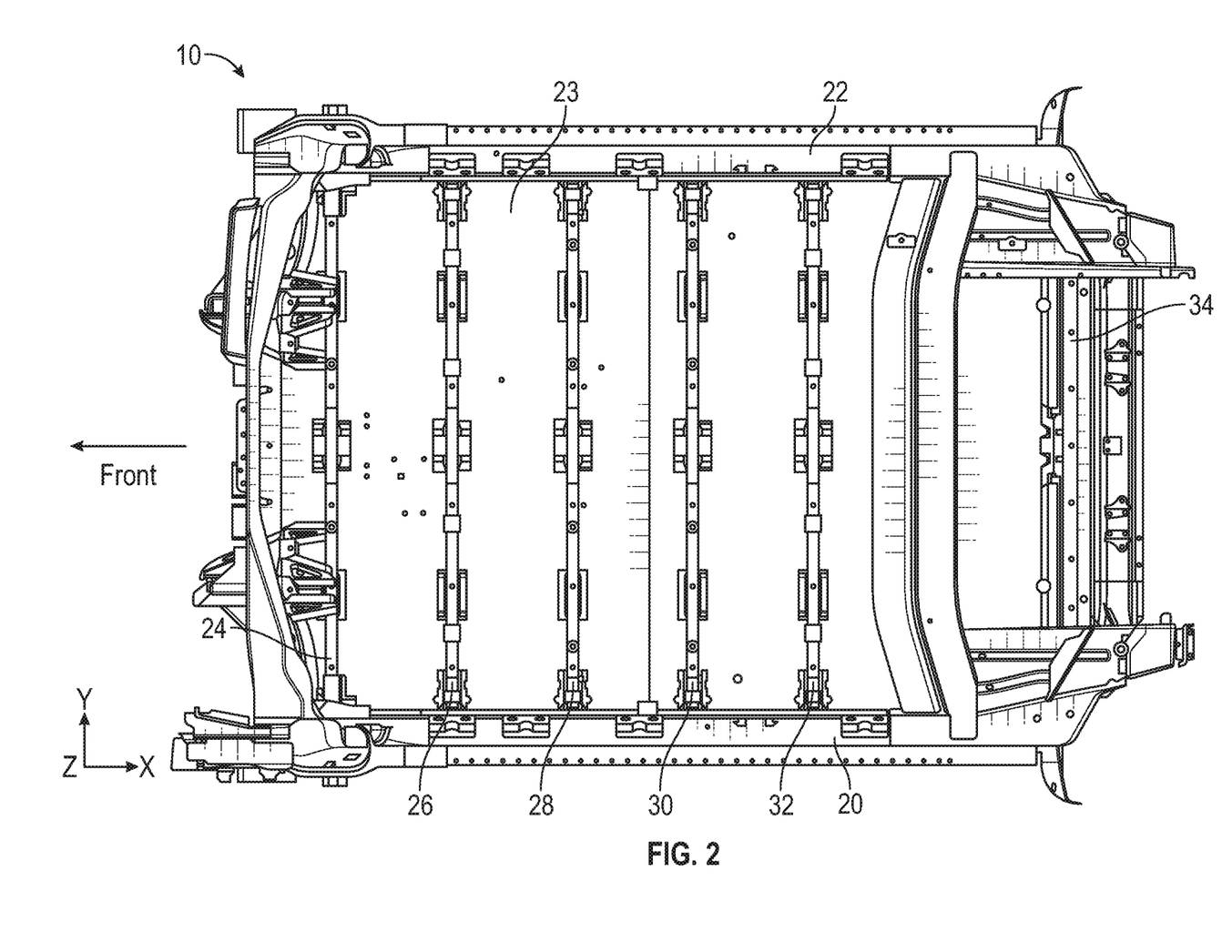
FIG. 2 is a top view illustrating battery cross bars.

Referring further to FIG. 2, there is shown the assembly 10 with the floor 12 removed revealing a battery 23 and a set battery cross bars 24, 26, 28, 30, and 32 along with secondary battery cross bar 34 shown previously in FIG. 1. The battery cross bars 24, 26, 28, 30, 32, and 34 are positioned above the bottom of the battery compartment of a lower panel 38 that is substantially parallel to the floor 12. The components or cells of the battery are positioned between the battery cross bars 24, 26, 28, 30 and 32. The ends of the battery cross bars 24, 26, 28, 30, 32 and 34 are attached, for example, by welding, bolts or any other suitable attachment mechanism to the respective rockers 20 and 22. The battery cross bars 24, 26, 28, 30, 32 and 34 are generally spaced apart, parallel to each other, and perpendicular to the rockers 20 and 22. Although FIG. 2 shows six battery cross bars, in some arrangements, the assembly 10 includes fewer than six battery cross bars, while in other arrangements, the assembly 10 includes more than six battery cross bars. The cross bars 24, 26, 28, 30, and 34 are made of steel, aluminum or composite structure.

Figure 3:
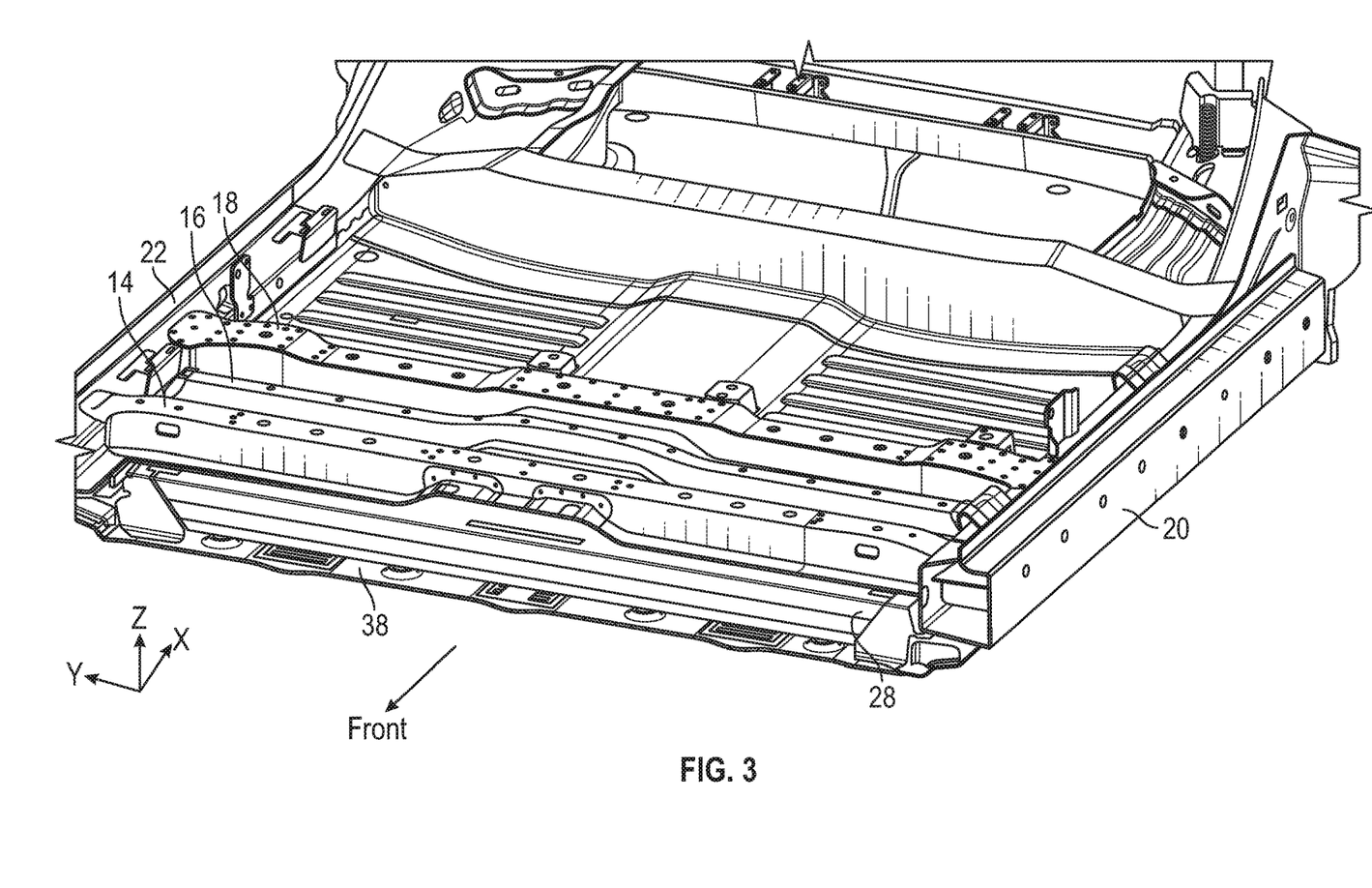
FIG. 3 is a perspective view of the assembly shown in FIGS. 1 and 2.
Figure 4A:
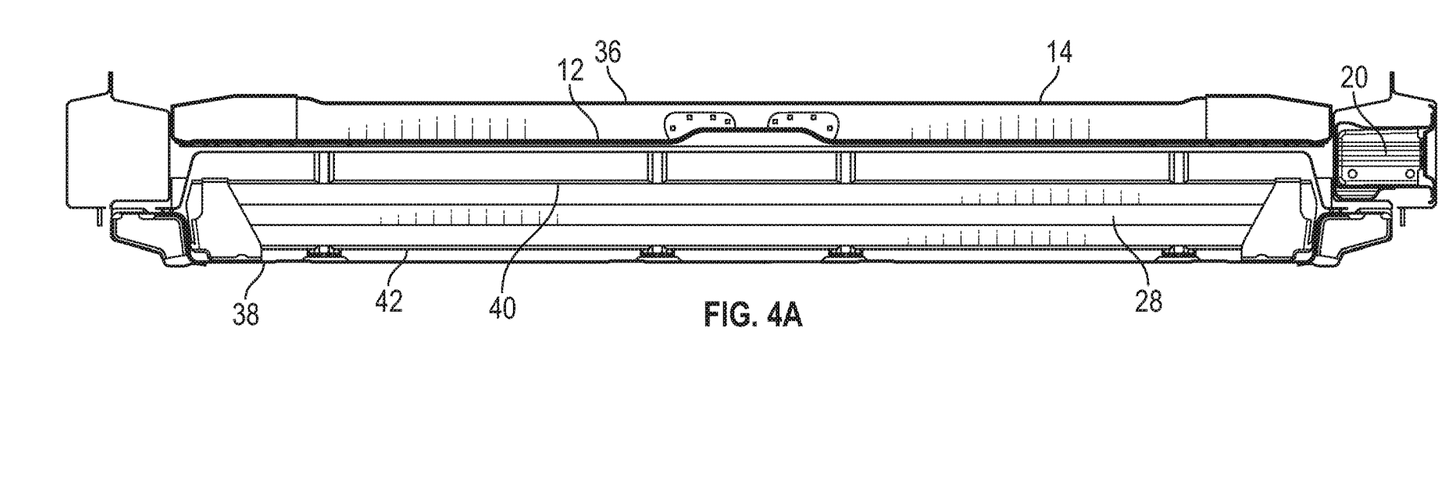
FIG. 4A is a cross sectional view of the assembly shown in FIGS. 1 and 2.

Referring to FIG. 4A, there is shown a cross-sectional view of the assembly shown in FIG. 3 further illustrating the arrangement of the body cross bars and the battery cross bars. Again, the body cross bar 14 with a top surface 36 is positioned above the floor 12. The battery cross bar 28 with a top surface 40 and a bottom surface 42 is positioned between the floor 12 and the bottom of the battery compartment or lower panel 38.

Figure 4B:
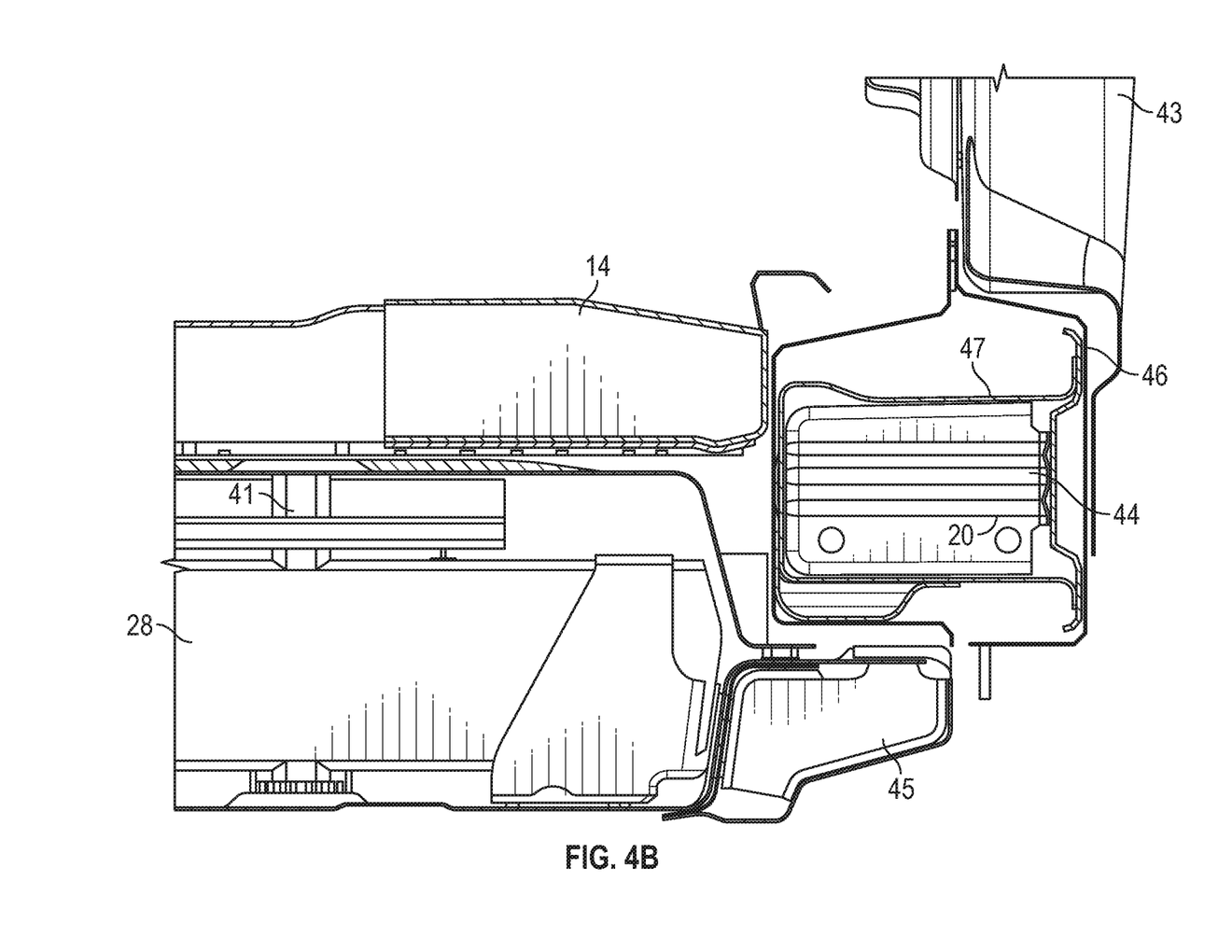
FIG. 4B is a close up cross sectional view of the assembly shown in FIGS. 1 and 2.
Figure 5:
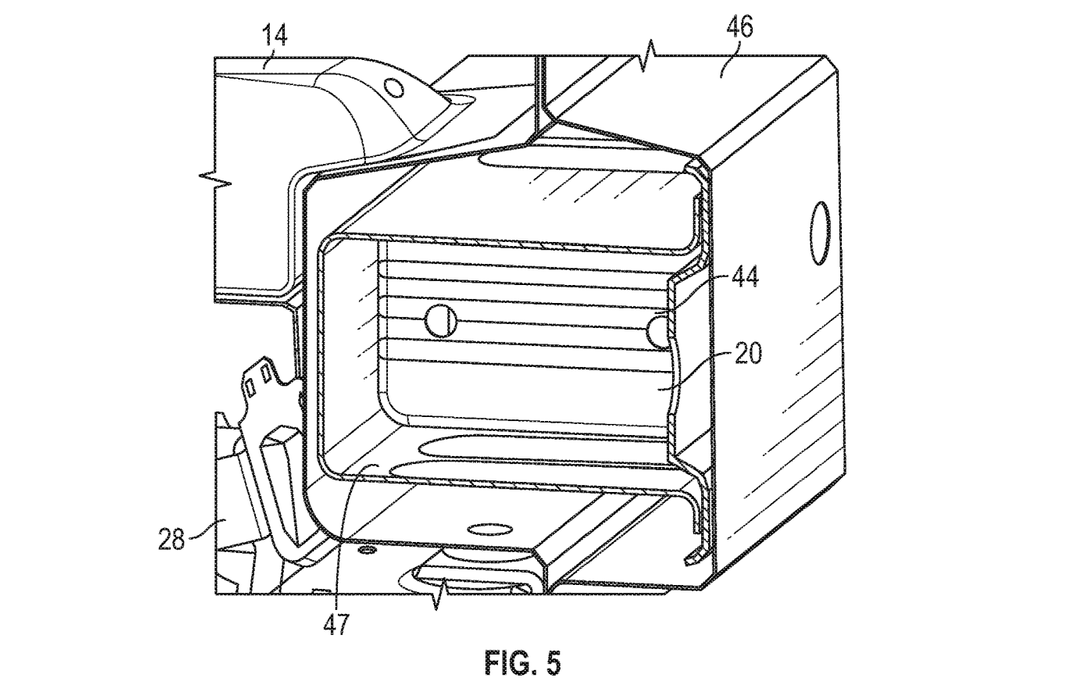
FIG. 5 is a perspective view of a body rocker for the assembly shown in FIGS. 1 and 2.

Referring further to FIGS. 4B and 5, there is shown a close up region of the rocker 20. Positioned beneath the rocker 20 is a battery rocker 45. A similar battery rocker is positioned beneath the rocker 22. The rocker 20 includes an inner portion 44 surrounded by a web 47, which in turn is surrounded by the outer web 46 to which, the body cross bars 14, 16 and 18 attach. The rocker 22 has a similar structure.

Figure 6:
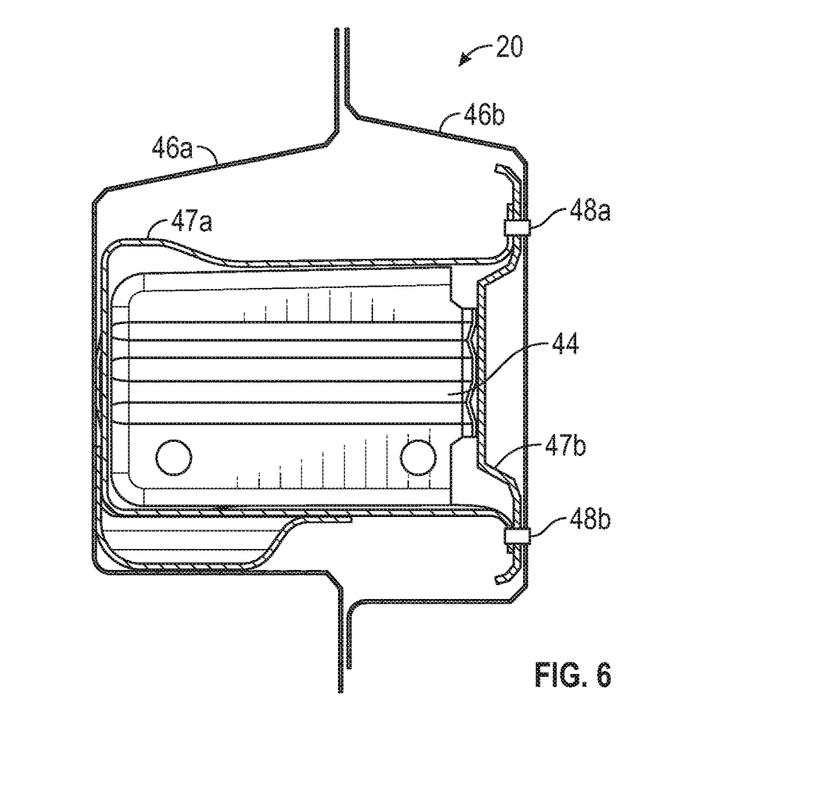
FIG. 6 is cross sectional view of the body rocker shown in FIG. 5.

Referring to FIG. 6, the inner web 47 includes two components 47a and 47b, and the outerweb 46 includes two components 46a and 46b. The two components 47a and 47b and the component 46b of the outer web 46 are welded together by a set of welds 48a and 48b along the length of the rocker 20.

As mentioned above, the rockers 20 and 22 are made of steel. In particular arrangements, each of the components, 44, 46 and 47 are made of high strength steel. In various arrangements, the portion 47b is thicker than the portion 46a. As such, during a side impact to the vehicle by an external force, the high strength steel reinforcement by the web portion 47b delays initial deformation to the rockers 20 or 22 and, therefore, increases bending strength. The outboard weld joints at 48a and 48b create hard corners that further resist deformations. The inner portion 44 is beaded to further increase strength as shown in FIGS. 5 and 6. The inner portion 44 further stabilizes the section for bending and crush and further increases energy absorption. Accordingly, after the initial deformation, the inner portion 44 distributes the load to the body cross bars 14, 16, 18 and the battery cross bars 24, 26, 28, 30, 32, 34 which are configured to withstand a maximum load.

Accordingly, the body rockers 20 and 22 protect the battery 23 by both absorbing the load from the side impact and increasing bending strength by delaying initial deformation at the outer surface of the rockers 20 and 22 and distributing the load to the body cross bars and the battery cross bars. Hence, the assembly 10 enables rockers 20 and 22 to be made from steel that is weldable to resist intrusion into the battery compartment during a side impact. The battery cross bars 24, 26, 28, 30, 32 and 34, the body cross bars 14, 16 and 18, and the body rockers 20, and 22 are configured for high strength to maximize the strength of the system by delaying initiation of rocker plastic deformation. As the body rockers 20 and 22 crush beyond the initiation of deformation, they absorb energy and distribute loading to the body cross bars 14, 16 and 18 and battery cross bars 24, 26, 28, 30, 32 and 34 when the vehicle is subjected to lateral deformation from an external force.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An assembly for a vehicle to provide load distribution between a body of the vehicle and a battery contained in the vehicle, the assembly comprising:
    a pair of body rockers, the pair of body rockers being spaced apart and being substantially parallel to each other;
    a plurality of body cross bars that extend between the pair of body rockers, the plurality of body cross bars being spaced apart, substantially parallel to each other, and substantially perpendicular to the pair of body rockers; and
    a plurality of battery cross bars that extend between the pair of body rockers, the plurality of battery cross bars being spaced apart, substantially parallel to each other, and substantially perpendicular to the pair of body rockers, portions of the battery being located between adjacent battery cross bars,
    wherein the plurality of battery cross bars, the plurality of body cross bars and the pair of body rockers are configured for high strength to maximize strength of the assembly by delaying initiation of rocker plastic deformation, and as the pair of body rockers crush beyond initiation of rocker plastic deformation, they absorb energy and distribute loading to the body cross bars and battery cross bars when the vehicle is subjected to lateral deformation from an external force.

2. The assembly of claim 1 further comprising a floor, the floor being positioned between the plurality of body cross bars and the plurality of battery cross bars.

3. The assembly of claim 1 wherein the plurality of body cross bars is three body cross bars.

4. The assembly of claim 1 wherein the plurality of battery cross bars is six battery cross bars.

5. The assembly of claim 4 wherein the plurality of battery cross bars is eight battery cross bars.

6. The assembly of claim 1 wherein each body rocker includes an inner portion and a web portion that surrounds the inner portion.

7. The assembly of claim 6 wherein the web portion includes an inner web portion and an outer web portion.

8. The assembly of claim 7 wherein an outer portion of the inner web portion is welded to the outer portion of the outer web portion.

9. The assembly of claim 1 wherein the pair of body rockers is made of steel.

10. A vehicle body subjectable to an external force, the vehicle body comprising:
    a floor having substantially parallel outer sides;
    a pair of body rockers, the pair of body rockers being spaced apart and being substantially parallel to each other, the pair of body rockers extending substantially along outer sides of the floor;
    a plurality of body cross bars that extend between the pair of body rockers, the plurality of body cross bars being spaced apart, substantially parallel to each other, and substantially perpendicular to the pair of body rockers; and
    a plurality of battery cross bars that extend between the pair of body rockers, the plurality of battery cross bars being spaced apart, substantially parallel to each other, and substantially perpendicular to the pair of body rockers, portions of the battery being located between adjacent battery cross bars, the floor being positioned between the plurality of body cross bars and the plurality of battery cross bars,
    wherein the plurality of battery cross bars, the plurality of body cross bars and the pair of body rockers are configured for high strength to maximize strength of the vehicle body by delaying initiation of rocker plastic deformation, and as the pair of body rockers crush beyond initiation of rocker plastic deformation, they absorb energy and distribute loading to the body cross bars and battery cross bars when the vehicle is subjected to lateral deformation from an external force.

11. The vehicle body of claim 10 wherein the plurality of body cross bars is three body cross bars.

12. The vehicle body of claim 10 wherein the plurality of battery cross bars is six battery cross bars.

13. The vehicle body of claim 12 wherein the plurality of battery cross bars is eight battery cross bars.

14. The vehicle body of claim 10 wherein each body rocker includes an inner portion and a web portion that surrounds the inner portion.

15. The vehicle body of claim 14 wherein the web portion includes an inner web portion and an outer web portion.

16. The vehicle body of claim 15 wherein an outer portion of the inner web portion is welded to the outer portion of the outer web portion.

17. The vehicle body of claim 10 wherein the pair of body rockers is made of steel.

18. A vehicle body subjectable to an external force, the vehicle body comprising:
    a floor having substantially parallel outer sides;
    a pair of body rockers made of steel, the pair of body rockers being spaced apart and being substantially parallel to each other, the pair of body rockers extending substantially along the outer sides of the floor, each body rocker includes an inner portion and a web portion that surrounds the inner portion;
    a plurality of body cross bars that extend between the pair of body rockers, the plurality of body cross bars being spaced apart, substantially parallel to each other, and substantially perpendicular to the pair of body rockers; and
    a plurality of battery cross bars that extend between the pair of body rockers, the plurality of battery cross bars being spaced apart, substantially parallel to each other, and substantially perpendicular to the pair of body rockers, portions of the battery being located between adjacent battery cross bars, the floor being positioned between the plurality of body cross bars and the plurality of battery cross bars,
    wherein the plurality of battery cross bars, the plurality of body cross bars and the pair of body rockers are configured for high strength to maximize strength of the vehicle body by delaying initiation of rocker plastic deformation, and as the pair of body rockers crush beyond initiation of rocker plastic deformation, they absorb energy and distribute loading to the body cross bars and battery cross bars when the vehicle is subjected to lateral deformation from an external force.

19. The vehicle body of claim 18 wherein the web portion includes an inner web portion and an outer web portion.

20. The vehicle body of claim 19 wherein an outer portion of the inner web portion is welded to the outer portion of the outer web portion.

\* \* \* \* \*